United States Patent [19]
Cabot

[11] 3,852,484
[45] Dec. 3, 1974

[54] METHOD OF PRODUCING VEGETABLE PROTEIN SEAFOOD SUBSTITUTES

[75] Inventor: John M. Cabot, Quincy, Ill.

[73] Assignee: Central Soya Company, Inc., Fort Wayne, Ind.

[22] Filed: Jan. 10, 1972

[21] Appl. No.: 216,834

[52] U.S. Cl............... 426/104, 426/250, 426/331, 426/364, 426/507, 426/516, 426/520, 426/802
[51] Int. Cl. .............................................. A23j 3/00
[58] Field of Search .......... 99/14, 17; 426/104, 250, 426/331, 364, 507, 516, 520, 802

[56] References Cited
UNITED STATES PATENTS

| | | | |
|---|---|---|---|
| 2,881,076 | 4/1959 | Sair | 99/17 X |
| 3,365,440 | 1/1968 | Circle et al. | 99/17 X |
| 3,488,770 | 1/1970 | Atkinson | 99/17 |

*Primary Examiner*—James R. Hoffman
*Attorney, Agent, or Firm*—Dawson, Tilton, Fallon & Lungmus

[57] ABSTRACT

A method of producing high protein soybean seafood substitutes — such as shrimp, scallops, etc. — wherein a soybean protein curd is first precipitated from a protein solution and then dispersed. Thereafter the pH is adjusted, and it is subjected to heat extrusion to yield a product amenable to further processing such as breading and deep frying.

9 Claims, No Drawings

METHOD OF PRODUCING VEGETABLE PROTEIN SEAFOOD SUBSTITUTES

SUMMARY OF THE INVENTION

The present invention relates to refrigerated or frozen protein vegetable shrimp substitute. Because of the high cost of shrimp as well as its tendency to spoil, a simple and inexpensive method has been sought for producing such a product that is characterized by a shrimplike taste, texture, and mouth feel.

Generally, such a substitute is produced by texturizing soybean or like protein source material (such as peanut protein) in a colloidal hydrated state — i.e., a curd at relatively low temperatures (under about 300° F.) and low pressures (under about 200 psi) — wherein the protein material is essentially free of fibrous residue and other non-proteinaceous components. Texturizing of the protein takes place by heat extrusion under the conditions specified and without the aid of denaturing agents such as acids, salts, or other chemicals heretofore thought necessary to obtain desired textural qualities. More specifically, such a method comprises a. precipitating the major globulin fractions of a vegetable protein solution essentially free of fibrous residue and other non-proteinaceous components as a curd at a temperature of less than about 150° F. and a pH of from 4.5 to 4.8, and separating the curd to achieve a solids content of from 15 to 25 percent by weight;

b. dispersing any large particles or agglomerates of the curd;

c. raising the pH of the curd to about 5.5 to about 7.0; and d. subjecting the modified curd to heat extrusion at a temperature of from 200° to 300° F. and a pressure of from 75 to 200 psi.

Other methods cited in the prior art involving extrusion indicate high temperature and pressure conditions, and, most importantly, depend upon the fibrous matrix of the source material — e.g., soy flour, concentrate, etc. — to obtain textural integrity. This fibrous matrix and other non-proteinaceous ingredients contribute flavor and textural properties that may detract from truly simulating seafoodlike qualities. Furthermore, they often have to be hydrated after extrusion. The method of the present invention overcomes these difficulties and provides a simple and inexpensive way of producing high protein soybean shrimp, scallop, lobster, etc. substitutes.

The practice of the present invention can be appreciated more fully from a consideration of the specific example which is set down below. The example provided is by way of illustration only, and is not meant to limit in any way the invention disclosed herein.

EXAMPLE

Soy protein curd is used in the invention method for the preparation of the shrimp substitute. It is made from selected defatted soybean flakes obtained by solvent extraction of high quality, sound, clean, dehulled soybeans. These flakes are treated in a mildly alkaline aqueous medium to extract the soluble protein constituents, carbohydrates, mineral matter, and other soluble minor flake components from the insoluble matter. The protein-containing extract is then separated from residual flake material and subsequently acidified with food grade hydrochloric acid. This results in the precipitation of the major globulin fractions of the soybean protein as a finely-divided white curd. The preparation of this soybean curd is more fully disclosed in co-owned U.S. Pat. No. 3,365,440.

In the present example, the curd was obtained at a temperature of 110° F. and a pH of 4.7, the curd having a solids content of 18 percent by weight. The curd was then immediately run through a 12 h.p. Hobart microcut colloid mill, Model MCV 12, operating at 3,500 rpm. to finely disperse any large particles remaining in the curd.

The pH of the curd was then adjusted to 6.1 utilizing 0.6N NaOH. The mixer utilized for this purpose was a Groen type Model DN/TA - 10 SP, with a speed setting of 0.7 maximum. After mixing to insure a uniform consistency, the material (i.e., modified curd) was extruded. A 7½ h.p. Prodex Extruder was used with a 1¾ inch diameter screw, 24:1 L/D ratio, and a maximum screw speed of 146 rpm.

The extruder contained three heating zones which were heated by ceramically insulated, tubular electrical heaters enclosed in an aluminum shell. The rear heating zone, which was nearest to the feed throat or entering end of the extruder, consisted of eight electrical heaters, with a total length of about 20 inches in the direction of flow through the extruder. The front heating zone, adjacent the rear heating zone, consisted of four electrical heaters, with a total length of about 13 inches in the direction of flow. The melt heater, which was located in the tapered or adaptor section of the extruder between the front end of the screw and the die, consisted of one electrical heater with a length of 1½ inches in the direction of flow through the extruder. Any extruder with a plurality of heating zones such that the curd is progressively heated as it passes through the extruder can be employed in the practice of this invention.

The curd material, after pH adjustment, was fed by hand into the feed throat of the extruder, and exited from the die, which had four 3/16 inch diameter round orifices. An additional run was made, without utilizing the die, so that the product then exited the extruder at the front end of the screw, with similar results.

The specific operation conditions used were:

| | |
|---|---|
| Rear Heating Zone | 200° F.; |
| Front Heating Zone | 250° F.; |
| Melt Heater (when used) | 250° F.; |
| Screw Speeds | 50, 75, and 100 rpm. |

The pressure differential between the extrusion barrel and atmosphere was from 100 to 150 psi using the die. Without the die, it was less than 100 psi, i.e., of the order of about 75 psi. Variation in the pressures occurred as a result of the hand feeding.

At 50 rpm the product was too crumbly. Utilizing the die, product quality and texture at 75 to 100 rpm were very nearly identical. The product was cut into desired lengths of, for example, ½ to 1½ inches in diameter and ½ to 1 inch in length, and was ready for further processing as by breading and deep fat frying to very closely resemble a shrimp product of excellent texture, mouth feel, and bland flavor. Identical results were obtained when the die was disconnected and the extruded product was collected from a run with a screw speed of 100 rpm. In this run the melt heater was disconnected.

After the product is collected from the extruder it can be prepared in various ways. It will be appreciated that this product is safe for direct human consumption, having been subjected to adequate heat processing. However, the product is normally refrigerated, frozen, or dried. As far as further processing is concerned, the product can be breaded and deep fried. Breading can be carried out in a conventional manner used for shrimp, scallops, and similar items. In the practice of the invention, a Durkee batter mix 572 was used with excellent results. The breaded product was deep fat-fried at 375° F. and, upon cooling, it was refrigerated. Other ways of preparation include sauteeing the unbreaded product, using it as such in combination with various vegetables and dressings for seafood salads, micro-wave cooking, or baking it for convenience foods. Depending upon the mode of preparation and the desired results, the curd, modified curd, or product can be flavored with conventional flavoring agents, viz., herbs and spices. Advantageously, the product is colored and flavored according to the species of seafood desired. Also, the foregoing, as well as antioxidants and preservatives, can be blended into the curd for uniform dispersion throughout, which is not possible with a preformed natural seafood.

It is apparent that various changes may be made in temperature, pH, solids content, screw speed, other vegetable protein source materials, or other parameters to alter textural properties so that with proper flavoring, other fish, poultry, and meatlike products, as well as cheeses, can be simulated without departing from the essential teachings and spirit of the invention.

I claim:

1. A method of producing vegetable protein seafood substitutes which comprises:
   a. taking an aqueous solution of a vegetable protein essentially free of fibrous residue and other non-proteinaceous materials and adjusting the temperature to less than about 150° F. and the pH to from about 4.5 to about 4.8 whereby the major globulin fractions precipitate as a curd, removing sufficient of said solution from said curd so that the resultant, separated curd has a solids content of from about 15 to about 25 percent by weight;
   b. dispersing large particles or agglomerates in said curd;
   c. raising the pH of said curd to about 5.5 to about 7.0;
   d. heating said curd at the last mentioned pH in an extruder to a temperature of from about 200° to about 300° F. and extruding the heated curd at a pressure of from about 75 to about 200 psi whereby the curd is modified to produce an extrudate having textural properties resembling those of seafood.

2. The method of claim 1 wherein in step (c) the pH of the curd is raised to about 6.

3. The method of claim 1 wherein the heat extrusion is carried out in an extruder with a plurality of heating zones such that said curd is progressively heated as it passes through said extruder.

4. The method of claim 1 wherein said vegetable protein is soybean protein.

5. A seafood substitute product according to the method of claim 1.

6. The method of claim 1 in which said extrusion step includes advancing said curd sequentially through a barrel extruder and a die wherein said die has orifices having an aggregate cross-sectional area less than the effective cross-sectional area of the barrel of said extruder.

7. The method of claim 1 in which the curd prior to extrusion had added thereto a flavoring, or a coloring agent.

8. The method of claim 1 in which the curd prior to extrusion has a preservative added thereto.

9. The method of claim 1 in which said extrudate is breaded and deep-fried.

* * * * *